United States Patent
Mangal et al.

(10) Patent No.: US 7,573,837 B1
(45) Date of Patent: Aug. 11, 2009

(54) ESTABLISHMENT OF MULTICAST PUSH-TO-X OVER CELLULAR (POC) COMMUNICATION

(75) Inventors: Manish Mangal, Overland Park, KS (US); Iris Zeng, Overland Park, KS (US); Craig C. Rhoades, Overland Park, KS (US); Mark A. Lipford, Leawood, KS (US); Wesam Alanqar, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 560 days.

(21) Appl. No.: 11/407,121

(22) Filed: Apr. 19, 2006

(51) Int. Cl.
*H04L 12/16* (2006.01)

(52) U.S. Cl. .................. 370/260; 370/390; 370/432; 455/416; 455/518

(58) Field of Classification Search .......... 370/260, 370/390; 455/416, 518
See application file for complete search history.

(56) References Cited

U.S. PATENT DOCUMENTS

| | | | |
|---|---|---|---|
| 5,887,252 | A | 3/1999 | Noneman |
| 6,104,709 | A | 8/2000 | Rinchiuso et al. |
| 6,215,790 | B1 | 4/2001 | Voit et al. |
| 6,625,773 | B1 | 9/2003 | Boivie et al. |
| 6,781,999 | B2 | 8/2004 | Eyuboglu et al. |
| 6,856,604 | B2 | 2/2005 | Lundby |
| 2001/0003706 | A1 | 6/2001 | Warburton et al. |
| 2003/0087653 | A1 | 5/2003 | Leung et al. |
| 2003/0211859 | A1 | 11/2003 | Chen et al. |
| 2004/0043770 | A1 | 3/2004 | Amit et al. |
| 2006/0205430 | A1* | 9/2006 | Park et al. .......... 455/518 |
| 2007/0019645 | A1* | 1/2007 | Menon .......... 370/390 |

FOREIGN PATENT DOCUMENTS

WO   WO 98/03002   1/1998

OTHER PUBLICATIONS

U.S. Appl. No. 09/993,213, filed Nov. 16, 2001 entitled Method and System for Multicasting Messages to Select Mobile Recipients.
Office Action from U.S. Appl. No. 10/830,376, dated Dec. 16, 2005.

(Continued)

*Primary Examiner*—Chirag G Shah
*Assistant Examiner*—Otis L Thompson, Jr.

(57) ABSTRACT

A method for establishing multicast PoC communication is disclosed. To establish multicast PoC communication, a multicast-join process will be coupled with a PoC session setup process, and the PoC server will function as a multicast content server, to multicast PoC communications to the PoC session participants. For example, when a party initiates a PoC session, the PoC server may acquire a multicast flow-ID from a multicast session manager, and the PoC server may convey that multicast flow-ID to each participant within the PoC session setup signaling. Upon receipt of the multicast flow-ID, each participant may then engage in signaling with the multicast session manager, to join the associated multicast group. And the multicast session manager may direct the PoC server to begin multicasting the associated flow to the group members, which the PoC server will do once it begins receiving PoC bearer data from one of the PoC session participants.

7 Claims, 4 Drawing Sheets

OTHER PUBLICATIONS

International Search Report from International Application No. PCT/US02/30131, dated Dec. 9, 2002.

International Preliminary Examination Report from International Application No. PCT/US02/30131, dated Jun. 19, 2003.

ZTE, ZTE Push-to-Talk Solution, Oct. 2003.

TR45, Wireless IP Architecture Based on IETF Protocols PN-4286-A (to be published as TIA/EIA/TSB-115), Jun. 6, 2000.

Tao Chen et al., "cmda2000 Broadcast Services Stage 2: System Design", Qualcomm Incorporated, Samsung Electronics Co, Ltd., SK Telecom, 2001.

* cited by examiner

ESTABLISHMENT OF MULTICAST PUSH-TO-X OVER CELLULAR (POC) COMMUNICATION

FIELD OF THE INVENTION

The present invention relates to wireless communications and, more particularly, to establishment of multicast Push-to-X over Cellular (PoC) sessions.

BACKGROUND

In a typical cellular wireless network, a geographic area is divided into cell sectors. Each cell sector defines a geographic area in which wireless terminals (such as cellular telephones, personal digital assistants (PDAs) and/or other devices) operate. The wireless network normally has a base transceiver station (BTS) assigned to one or more cell sectors. The BTS produces a radio frequency (RF) radiation pattern over the one or more cell sectors. The RF radiation pattern allows the wireless terminals located in the one or more cell sectors to exchange signals with the BTS over an air interface.

The wireless network typically has a plurality of BTSs. The plurality of BTSs communicates concurrently with a base station controller (BSC) that aggregates signals received from the plurality of BTSs. The plurality of BTSs and the BSC is commonly referred to as a base station. And the wireless network may have a plurality of base stations. The plurality of base stations in the wireless network is referred to as a base station system (BSS).

Each BSC in the wireless network may communicate with a packet gateway and a mobile switching center (MSC). The packet gateway and the MSC function to set up and connect calls with other entities. For example, the packet gateway may set up and connect calls with a server or other entity on an Internet protocol (IP) network, and the MSC may set up and connect calls with a telephone on a public switched telephone network (PSTN).

Generally, the BSC will assign a traffic channel respectively to each wireless terminal for transmitting and receiving signals over the air interface. Additionally, the packet gateway establishes a radio-packet (R-P) link with the BSC. The R-P link carries signals between the packet gateway and the BSC. The packet gateway establishes a separate R-P link for each wireless terminal in the wireless network, and in this regard, the signals carried by each R-P link are associated with a particular wireless terminal. The R-P link is referred to as the A10/A11 link in the code division multiple access (CDMA) network architecture.

In some instances, a server in the wireless network may send data to wireless terminals in the wireless network. The data may represent information of interest to users of the wireless terminals, such as sports scores, weather reports, or advertising messages for instance. Alternatively, the data might comprise real-time streaming media such as voice or video conference content or broadcast television or radio signals. In any event, the server may transmit the data to one or more wireless terminals by inserting the data into one or more packets and transmitting the packets to the one or more wireless terminals.

An increasingly popular feature of wireless communications in recent years, and one which makes use of the above data transmission construct, is push-to-talk "walkie-talkie" service. With this feature, a user of a suitably equipped cell phone can "instantly" establish communication with one or more other users by simply pressing a PTT button on the cell phone. When the user presses the PTT button, the cell phone responsively transmits a PTT session initiation message (a type of data message) to a PTT server on the IP network, designating one or more target subscribers with whom to establish the session. In response, the PTT server then engages in further session initiation signaling with each target subscriber and with the initiating subscriber, to set up a PTT session leg respectively between the PTT server and each subscriber. The PTT server then bridges those session legs together so that the subscribers can communicate with each other, and so the session begins. A similar arrangement can also be used to establish instant video communication ("push-to-view" (PTV)), or other sorts of instant communication, generally known as "Push-to-x over Cellular" or "PoC".

Unfortunately, however, one of the scarcest resources in a cellular communication system is the air interface between the BSS and the wireless devices. Typically, a given base station will be operate at a designated carrier frequency, or at one frequency on the "forward link" (from the base station to wireless devices) and at another frequency on the "reverse link" (from the wireless devices to the base station). Communications in a given cell sector may then be divided into channels by spread-spectrum modulation and/or time-division multiplexing, for instance. However, a limited number of such channels will exist.

Given this air interface limitation, most PoC systems are arranged to operate in a half-duplex mode, in which only one participant at a time has "the floor." The participant with the floor is considered to be the "talker," and each other participant is considered to be a "listener." (These terms are not restricted to PTT or literally to talking and listening but more broadly apply to PoC.) In practice, the PoC server will transmit to each listener the bearer data (e.g., voice, video, etc.) that the PoC server receives from the talker. Further, the PoC server will apply a floor control process, through which the PoC server allows any party to take the floor as long as no other party currently holds the floor.

In a scenario where multiple listeners in a PoC session are located in a common cell sector, it is a relatively inefficient use of air interface resources for a PoC server to send bearer data from the talker over separate PoC session legs, and particularly over separate air interface traffic channels, one to each listener. It would be far more efficient in such a scenario if the PoC server would instead multicast the talker's bearer data to the listeners. That way, a single copy of the talker's bearer data could be sent to the base station serving the cell sector, and the single copy could be transmitted over a common multicast air interface channel for receipt concurrently by all of the listeners in the cell sector. At issue, however, is how to set up a PoC session in a manner that allows the participants to receive such multicast transmissions from the PoC server.

SUMMARY

The present invention is directed to a method of establishing multicast PoC communication. More particularly, the invention is directed to a method of setting up a PoC session among a plurality of subscribers in such a way that the subscribers receive bearer data of the PoC session through multicast transmission from the PoC server. The invention thus helps to conserve limited air interface resources.

As a general matter, the invention operates to set up multicast PoC communication by inserting a multicast group registration function within the PoC session setup signaling process. In a preferred embodiment, for each PoC session participant, the PoC server will convey within PoC session setup signaling to the participant a muticast flow-ID that designated multicast transmission of PoC bearer data from the PoC server. PoC session setup signaling with that participant will then be paused briefly while the participant engages in signaling with a multicast session manager (MSM) to join the multicast group, i.e., to receive the multicast flow designated by the multicast flow-ID. Thereafter, PoC session setup signaling will then resume, to complete the PoC session setup process.

With this process, the basic PoC session setup signaling may operate as usual to establish participation in the PoC session and thus to enable session management by the PoC server. As such, the PoC session setup signaling may operate as usual to establish a unicast PoC session leg respectively with each participant. However, those unicast session legs may advantageously be used for the limited purpose of carrying bearer data to the PoC server when the participant is the talker, and the radio links associated with those unicast legs may otherwise be freed up for use by others. At the same time, the multicast group registration function will make the participant a member of a multicast group that is established to receive multicast communications from the PoC server for the PoC session. The PoC server can then function like a traditional multicast content-server, in that it will multicast content to a particular multicast group. Though, in this case, the multicast content will originate from the current talker in the PoC session.

The inventive method may be structured and characterized in various ways. In one respect, for instance, the method may involve carrying out the following functions with respect to each of a plurality of parties that are to be participants in a PoC session: (a) conveying PoC session setup signaling over a network between a PoC server and the party, (b) within the PoC session setup signaling, conveying from the PoC server to the party a multicast flow-ID that corresponds with multicast transmission of PoC-session bearer data from the PoC server, and (c) conveying multicast-join messaging between the party and a multicast session manager (MSM), wherein, through the multicast-join messaging, the party joins a multicast group for receiving the multicast transmission of PoC bearer data from the PoC server. In that way, after completion of the PoC session setup signaling, the PoC session may proceed, with the PoC server multicasting PoC-session bearer data for receipt by one or more members of the multicast group.

In another respect, the method may involve carrying out the following functions: (a) conducting first PoC session setup signaling between a PoC server and a first PoC session participant (e.g., a prospective participant), (b) during the first PoC session setup signaling, (i) providing from the PoC server to the first PoC session participant a multicast flow-ID, and (ii) the first PoC session participant using the multicast flow-ID to join a multicast group to which the PoC server will multicast PoC communications, and (c) after completion of the first PoC session setup signaling between the PoC server and the first PoC session participant, multicasting the PoC communications from the PoC server to the multicast group including at least the first PoC session participant.

Furthermore, this process may involve (d) conducting second PoC session setup signaling between the PoC server and a second PoC session participant, and (e) during the second PoC session setup signaling, (i) providing from the PoC server to the second PoC session participant the multicast flow-ID, and (ii) the second PoC session participant using the multicast flow-ID to join the multicast group for receiving PoC communications multicast from the PoC server. In that case, multicasting the PoC communications from the PoC server to the multicast group including at least the first PoC session participant may involve multicasting the PoC communications from the PoC server to the multicast group including the first PoC session participant and the second PoC session participant.

Still further, the process may include the PoC server acquiring the multicast flow-ID from an MSM, such as requesting and receiving the multicast flow-ID from the MSM in response to receipt of a first session initiation request for the PoC session. Further, the function of using the multicast flow-ID to join the multicast group for receiving PoC communications multicast from the PoC server may involve sending to the MSM a multicast JOIN request message specifying the multicast flow-ID, and receiving an affirmative multicast JOIN reply message from the MSM. In that case, the MSM may then direct the PoC server to begin multicasting PoC communications to the multicast group, which the PoC server may begin doing once the session is established and the PoC server begins receiving bearer data from a talker.

In the exemplary embodiment, each PoC session participant will be a cellular wireless client device. (Although it should be understood that the invention is not restricted to that scenario and could apply as well in a scenario where some or all of the conference participants are not cellular wireless devices or are not wireless devices at all.) Where the first PoC session participant is a cellular wireless client device, for instance, the act of multicasting the PoC communications from the PoC server to the multicast group including at least the first PoC session participant may involve transmitting the PoC communications from the PoC server to a multicast IP address defined by the multicast flow-ID. The PoC communications may thus be routed to a packet data serving node (PDSN) serving the first PoC session participant and from there to a radio access network and over a multicast radio link to the first PoC session participant.

In another respect, the method may involve carrying out the following functions: (a) conducting an INVITE-OK-ACK messaging transaction (e.g., a series of Session Initiation Protocol (SIP) or analogous message exchanges) between a PoC server and a PoC session participant, to set up a PoC session leg between the PoC server and the PoC session participant, (b) during the INVITE-OK-ACK messaging transaction, conveying from the PoC server to the PoC session participant a multicast flow-ID, for use by the PoC session participant to join a multicast group to which the PoC server will multicast PoC communications, and (c) after the INVITE-OK-ACK messaging transaction, multicasting the PoC communications from the PoC server to the multicast group including at least the PoC session participant. Further, the method may also involve, during the INVITE-OK-ACK transaction, the PoC session participant using the multicast flow-ID to join the multicast group.

In one embodiment, the act of conducting the INVITE-OK-ACK messaging transaction between the PoC server and the PoC session participant may involve (i) conveying an INVITE message from the PoC session participant to the PoC server, (ii) then conveying an OK message from the PoC server to the PoC session participant, and (iii) then conveying an ACK message from the PoC session participant to the PoC server, in order to set up a PoC session leg. In that case, the act of conveying the multicast flow-ID from the PoC server to the PoC session participant may involve conveying the multicast-flow ID within the OK message.

Alternatively, the act of conducting the INVITE-OK-ACK messaging transaction between the PoC server and the PoC session participant may involve (i) conveying an INVITE message from the PoC server to the PoC session participant, (ii) then conveying an OK message from the PoC session participant to the PoC server, and (iii) then conveying an ACK message from the PoC server to the PoC session participant. In that case, the act of conveying the multicast flow-ID from the PoC server to the PoC session participant may involve conveying the multicast-flow ID within the INVITE message.

As in the above embodiments, the exemplary method may further involve the PoC server acquiring the multicast flow-ID from an MSM, such as by requesting the multicast flow-ID from the MSM after receiving an initial PoC session INVITE. In that case, the act of the session participant using the multicast flow-ID to join the multicast group for receiving PoC communications multicast from the PoC server may involve sending to the MSM a multicast JOIN request message specifying the multicast flow-ID, and receiving an affirmative multicast JOIN reply message from the MSM. After at least one party joins the multicast group for the PoC session, the MSM may then direct the PoC server to begin multicasting PoC communications to the multicast group, which, as noted above, the PoC server may begin doing once it starts receiving bearer data from a talker.

In a further respect, the inventive method may involve the following functions: (a) conveying a first initiation request from an initiating party to a PoC server, the first initiation request seeking establishment of a PoC session between the initiating party and at least one target party, (b) conveying from the PoC server to a target party a second initiation request provided by the PoC server after receipt of the first initiation request, the second initiation request containing a multicast flow-ID provided by a multicast session manager (MSM), the multicast flow-ID corresponding with a multicast flow for multicasting PoC communications of the PoC session from the PoC server to one or more participants in the PoC session, (c) conveying from the target party to the MSM a first join request defining a request by the target party to receive the multicast flow, the first join request being provided by target party after the target party receives the second initiation request, (d) conveying from the MSM to the target party a first join reply granting the first join request, and conveying from the MSM to the PoC server a directive for the PoC server to multicast, in the multicast flow, PoC communications to one or more participants in the PoC session, (e) conveying from the target party to the PoC server an acceptance of the second initiation request, the acceptance of the second initiation request being provided by the target party after the target party receives the first join reply, and (f) conveying the multicast flow from the PoC server to at least each listener in a group comprising the target party, wherein the multicast flow carries the PoC communications of the PoC session.

Furthermore, the exemplary method may involve (g) conveying from the PoC server to the initiating party an acceptance of the first initiation request, the acceptance of the first initiation request being provided by the PoC server after the PoC server receives the acceptance of the second initiation request, the acceptance of the first initiation request containing the multicast flow-ID, (h) conveying from the initiating party to the MSM a second join request defining a request by the initiating party to receive the multicast flow, the second join request being provided by initiating party after the initiating party receives the acceptance of the first initiation request, and (i) conveying from the MSM to the initiating party a second join reply granting the second join request.

These as well as other aspects, advantages, and alternatives, will become apparent to those of ordinary skill in the art by reading the following detailed description with reference, where appropriate, to the accompanying drawings.

DETAILED DESCRIPTION

1. Example Network

Figure 1:
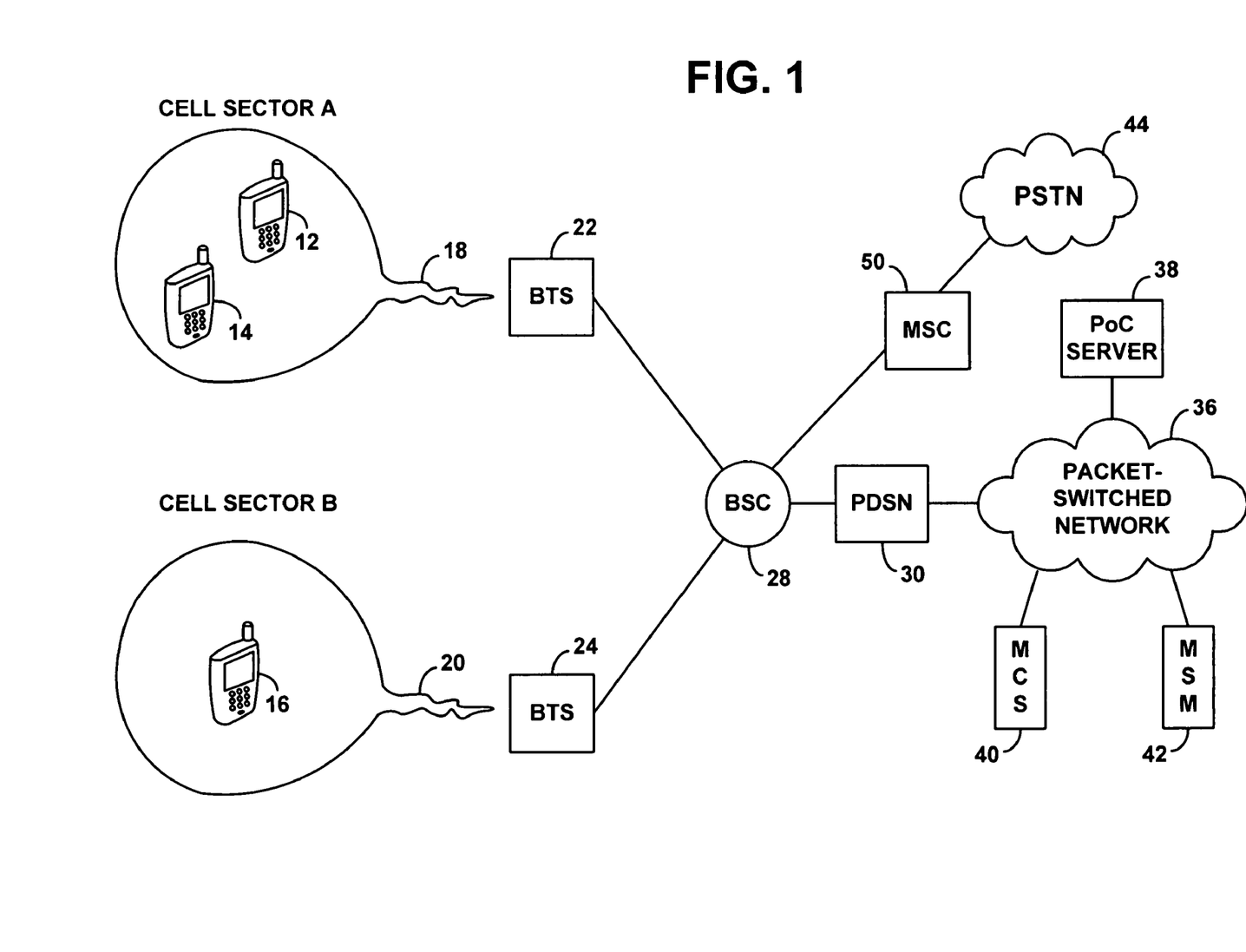
FIG. 1 is a simplified block diagram of a network in which an exemplary embodiment of the invention can be implemented.

Referring to the drawings, FIG. 1 is a simplified block diagram depicting an example network in which an exemplary embodiment of the invention can be implemented. It should be understood, of course, that this and other arrangements and processes described herein (including in the foregoing summary section) are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

As shown in FIG. 1, the exemplary network 10 includes wireless terminals 12, 14, 16 and a BSS. The wireless terminals may take the form of cellular telephones, cellular video terminals, wireless PDAs, or wireless personal computers, for example, and the BSS may include. BTSs 22, 24 and BSC 28. The network may also have a packet data serving node (PDSN) 30, an MSC 50, a PSTN 44, and a packet-switched network 36 (e.g., the Internet, or a private packet network), as in conventional cellular networks.

The wireless terminals 12, 14, 16 may be communicatively coupled with BTS 22 and 24 as shown, via air interfaces 18, 20. The wireless terminals 12, 14, 16 may communicate with BTS 22, 24 over the air interfaces 18, 20 by an air interface protocol as set forth in the well known TIA/EIA/IS-2000 or TIA/EIA/IS-856 standards, and/or by any other air interface protocol now known or later developed.

The BSS produces radiation patterns that defines one or more cell sectors A, B of the wireless network. The radiation patterns enable the wireless terminals 12, 14, 16 to exchange signals with the BSS over the air interface 18. The wireless terminals 12, 14, 16 operate in one of the cell sectors A, B, and can move between the cell sectors, preferably without communication with the BSS being disrupted. Although two cell sectors are shown, any number of cell sectors could be provided. By the same token, although only three wireless terminals, any number of wireless terminals could be provided, and they may be distributed differently among the various cell sectors. Other variations in the arrangement shown are possible as well.

PDSN 30 provides an interface into the packet-switched network 36 and may thus constitute a packet gateway. In particular, PDSN 30 may interface between radio network communications (via BSC 28) and communications on packet-switched network 36. As such, PDSN 30 may include one or more processors, data storage, a BSS interface for exchanging signals with the BSS, and a packet-network interface for communicating on network 36.

In a conventional manner, wireless terminals 12, 14, 16 can gain packet-data connectivity so as to be able to engage in packet-data communication on network 36. For instance, a wireless terminal may send a packet-data origination request to MSC 50, which MSC 50 may forward back to BSC 28. BSC 28 may then assign an air interface traffic channel (radio link) for use by the wireless terminal. Further, BSC 28 may forward the request to PDSN 30, which may then enter into a data link layer connection (e.g., point to point protocol (PPP) session) with the wireless terminal, and the PDSN or a mobile-IP home agent (not shown) may assign a mobile IP address to the wireless terminal.

Each wireless terminal is preferably equipped to be able to engage in PoC communications. As such, each terminal may include user-interface components such as a microphone and speaker for exchanging voice or other media with a user, and each terminal may include and circuitry for converting the media between analog and digital formats. Each terminal may then further include one or more codecs (e.g., G.723.1) for compressing/decompressing the digitized media, and logic for communicating the media in a sequence of packets over network 36. And to facilitate setup and management of PoC communications, each terminal may be programmed to engage in session setup signaling, such as Session Initiation Protocol (SIP) signaling or H.323 signaling for instance. And each terminal may include a PoC-button that a user can engage in order to initiate a PoC session or request the floor in an existing PoC session.

In addition, each terminal is preferably equipped to be able to join multicast groups and receive multicast communications from multicast content servers. In this regard, each terminal, may be programmed to send a JOIN request to an multicast session manager, designating a particular multicast group that the terminal seeks to join, and each terminal may be programmed to receive a JOIN reply from the multicast session manager, which could provide the terminal with data (such as a multicast IP address, filter, key, mask, or the like) that the terminal can use in order to receive the multicast flow. Each terminal may then be programmed to listen for incoming multicast bearer traffic of the designated flow, and to present that incoming traffic to a user.

Further shown sitting as nodes on network 36 are a PoC server 38, a multicast application server (MCS) 40, and a multicast session manager (MSM) 42. Although these nodes are shown as separate blocks in FIG. 1, it should be understood that the nodes are functional entities, and any or all of their functions could be integrated into a single platform and could just as well be arranged in a manner other than that shown. At a base level, each of the nodes shown may include one or more processors, data storage, a packet-network interface for communicating on network 36, and program instructions stored in the data storage and executable by the processor to carry out various functions described herein.

PoC server 38 generally comprises a conference server, such as a multipoint conference unit (MCU) and an IP-call control function, for hosting PoC sessions. As such, PoC server 38 may be programmed to engage in session setup signaling (such as SIP or H.323 signaling) so as to establish a PoC session leg respectively with each PoC session participant, and to bridge those legs together so as to allow the session participants to communicate with each other. Further, PoC server 38 may be programmed to manage the floor in PoC sessions.

MCS 40 is an example of a typical multicast content server, which functions to multicast content to destinations such as wireless terminals 12, 14, 16. In order to multicast content, MCS 40 may insert the content into IP packets and transmit the packets to a multicast IP address to which the destination terminals are programmed to listen. In the exemplary embodiment, as will be described more below, PoC server 38 will behave similarly as a multicast content server.

MSM 42 generally functions to manage multicast group memberships. As such, the MSM 42 may receive a multicast JOIN message from a wireless terminal seeking to join a particular multicast group designated by a multicast flow-ID. After authenticating the terminal (e.g., by querying an authentication server (not shown), the MSM 42 may then send an affirmative JOIN reply to the terminal, which may provide the terminal with the multicast IP-address to which the terminal should listen. Further, once a first terminal joins a given multicast group, the MSM 42 may direct a multicast content server (such as MCS 40 or, in the present invention, PoC server 38) to begin multicasting the associated flow.

2. Example PoC Operation

As noted above, to establish a PoC session between a plurality of parties, one of the parties typically sends a session initiation message to the PoC server, and the PoC server then engages in further session setup signaling with that party and with the other parties in order to set up a PoC session leg respectively between the PoC server and each party. The PoC server then bridges those PoC session legs together so that the parties can communicate with each other. Further, if half-duplex operation is desired, the PoC server then typically applies a floor control process.

Preferably, SIP will be used to set up and tear down each PoC session leg, and digitized media will be packetized and carried from each party to the PoC server according to the Real-time Transport Protocol (RTP). The core industry standards for SIP (Internet Engineering Task Force (IETF) Request For Comments (RFC) 2543) and RTP (IETF RFC 1889) are hereby incorporated by reference.

As is well known in the art, SIP is a text-encoded protocol based on elements from the Hyper Text Transport Protocol (HTTP) and the Simple Mail Transport Protocol (SMTP). Generally speaking, SIP uses a client-server transaction model, similar to HTTP. A SIP client generates a SIP request or "method," and a SIP server responds to the request by generating a SIP response. (The characterization of a given entity as a client or server depends on whether the entity is initiating or responding to a SIP request in the given instance.) Each SIP message typically begins with a line designating a method name or a response code and then continues line-by-line with a list of headers fields, each having a field name and an associated field value.

For example, the basic method for initiating a session in SIP is the "INVITE" method, which may appear generally as follows:

INVITE sip: UserB@there.com SIP/2.0
Via: SIP/2.0/UDP 1.2.3.4:5060
To: UserB <sip:UserB@there.com)
From: UserA <sip:UserA@here.com>
Call-ID: 987123654@1.2.3.4
CSeq: 1 INVITE
Contact: <sip:UserA@1.2.3.4>
Content-Length: 126
Timestamp: 1060972582

In this example, the first line designates the method name (INVITE) and a request-URI, followed by a SIP version. The Via header then designates an IP address and port of the message originator. (Each entity that forwards the request would add its own Via header to the message, to facilitate routing of a response.) The To header next indicates a display name and URL of the destination party, and the From header indicates the display name and URL of the originator. The Call-ID header contains a unique identifier for the session being set up, to be included in all messages related the session. The Contact header next contains one or URLs for use in contacting the originator. The Content-Length header is a count of the number of bytes making up the message body. And the Timestamp header indicates the time when the originating station started the session setup process. (The Timestamp header value would remain the same throughout the remaining SIP messaging exchanged for the session.)

SIP also makes use of another protocol known as the "Session Description Protocol" (SDP) in order to allow SIP endpoints to exchange information about media type and other session characteristics (such as whether the session will involve an exchange of voice, video, audio, etc., and what codecs the endpoints will use). A SIP message can include a number of SDP lines, which, like other lines of the SIP message, include a field name and an associated field value. The core SDP specification (IETF RFC 2327) is hereby incorporated by reference.

SIP defines a basic "INVITE/OK/ACK" message-exchange transaction for use in setting up a communication session, or call leg, between a two endpoints. In practice, the initiating endpoint first sends an INVITE to the other endpoint, including an SDP block describing the type of session desired. If the other endpoint agrees to participate in the session, it then responds with a SIP "200 OK" message. Lastly, the initiating endpoint then sends to the other endpoint a SIP "ACK" message to complete setup of the session. The two endpoints may then begin communicating with each other in the agreed manner.

To set up a PoC session between two or more wireless terminals via a PoC server, an initiating terminal will engage in an INVITE/OK/ACK transaction with the PoC server to set up an "originating" PoC session leg between the initiating terminal and the server, and the PoC server will engage in an INVITE/OK/ACK transaction respectively with each target terminal to set up a "terminating" conference leg with each other terminal. The PoC server will then bridge those legs together to allow users of the terminals to communicate with each other.

In typical practice, the SIP signaling used to set up the originating leg will be interleaved with SIP signaling used to set up each terminating leg. For instance, the initiating terminal may first send an INVITE to the PoC server, designating one or more target parties (e.g., providing a group-ID, which the PoC server can resolve into group members by reference to a data store), and the PoC server may then send an INVITE respectively to each target terminal. Once one or all of the target terminals responds to the PoC server with a 200 OK, the PoC server may then send a 200 OK to the initiating terminal. Finally, the initiating terminal would send an ACK to the server, and the server would send an ACK to each of the target stations, thus completing set up of the conference legs.

Figure 2:
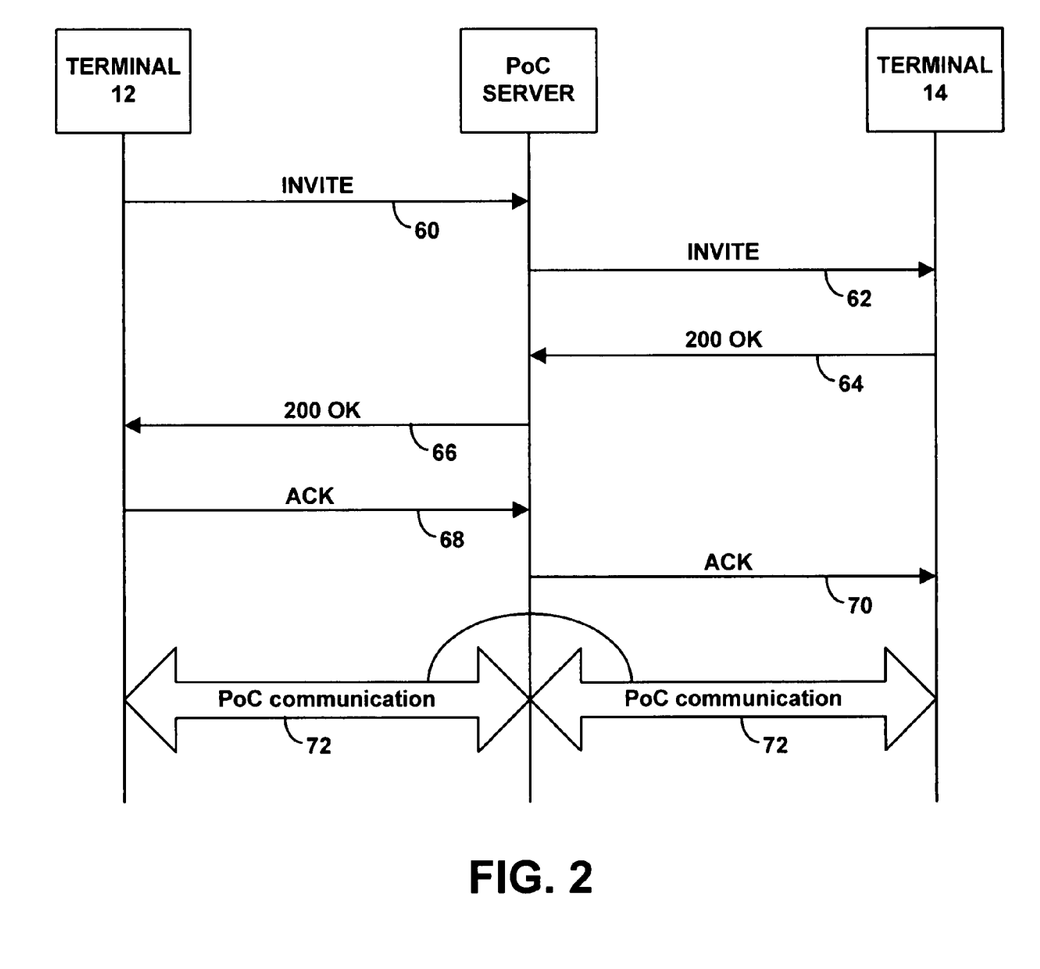
FIG. 2 is a message flow diagram depicting setup of a PoC session.

FIG. 2 depicts this message flow for setup of a PoC session between wireless terminals 12 and 14, assuming terminal 12 initiates the session. As shown in FIG. 2, at step 60, terminal 12 sends an INVITE to PoC server 38, designating terminal 14 as a target terminal. At step 62, PoC server 38 responsively sends an INVITE to terminal 14. At step 64, terminal 14 sends a 200 OK to PoC server 38, accepting the PoC server's invitation. And at step 66, PoC server 38 sends a 200 OK to terminal 12, accepting the terminal's invitation. At step 68, terminal 12 then sends an ACK to the PoC server 38, to complete setup of a PoC session leg between terminal 12 and the PoC server. And at step 70, the PoC server then sends an ACK to terminal 14, to complete setup of a PoC session leg between the PoC server and terminal 14. At step 72, communication then proceeds (typically half-duplex), with PoC server 38 bridging the session legs together.

3. Example Multicast Operation

As noted above, in order for a wireless terminal to begin receiving multicast communications, the terminal may send a JOIN message to MSM 42, designating the desired group by multicast flow-ID. (The multicast flow-ID may itself be the multicast IP address for the group, or it may be some other label for the multicast group.) The MSM 42 may then send an affirmative JOIN reply to the wireless terminal, and the MSM 42 may direct the MCS 40 to begin multicasting the associated flow to the group. U.S. patent application Ser. No. 10/829,704 (the '704 application), filed Apr. 22, 2004, and entitled "Method and System for Multicasting Messages to Wireless Terminals," describes a suitable process for establishing such multicast communications, particularly where multiple recipient terminals may be located in a common cell sector. The '704 application is hereby incorporated by reference in its entirety.

As described in the '704 application, separate multicast link may be in place between the PDSN 30 and the BSS respectively for each cell sector served by the PDSN. The multicast link is preferably an R-P link of the same type that would normally be established for carrying packet-data to and from a given wireless terminal, but a multicast R-P link will instead serve a given cell sector and thus possibly multiple wireless terminals operating in the cell sector. Multicast content (e.g., from MCS 40) can thus be sent on a given cell sector's multicast link from the PDSN to the BSS and then transmitted (broadcast) by the BSS to wireless terminals operating in that cell sector.

To facilitate transmission of multicast content to more than one wireless terminal in a given cell sector, the cell sector may have a reserved multicast radio link (e.g., a given Walsh code and/or other sort of traffic channel). When the BSC 28 serving that cell sector receives multicast content on the multicast R-P link from the PDSN 30, the BSC 28 may then programmatically transmit that multicast content on the multicast radio link for that cell sector. Further, when a wireless terminal is in a "multicast state" in which it will be listening for incoming multicast traffic, the terminal will programmatically begin listening for traffic on that multicast radio link. Thus, any wireless terminals in the cell sector that are listening for traffic on that multicast radio link may then receive the multicast content transmission.

As further described, PDSN 30 may programmatically monitor, per cell sector that the PDSN serves, how many wireless terminals currently operating in the cell sector are in the multicast state. When the number transitions from zero to at least one for a given cell sector, the PDSN may then switch the multicast link for that cell sector to active. On the other hand, then the number transitions to zero for a given cell sector (i.e., when the last wireless terminal that was in the cell sector in the multicast state transitions to a non-multicast state or exits the cell sector), the PDSN will switch the multicast link for that cell sector to inactive.

To accomplish this, the PDSN may maintain in data storage a sector-table that indicates, per cell sector, the number of wireless terminals currently in the multicast state. And the PDSN may keep the sector-table up to date by reading the JOIN reply messages sent from the MSM to the wireless terminals and updating the table when a wireless terminal in a given cell sector joins a multicast group or de-registers from a multicast group.

In practice, the PDSN 30 will function as an IP router to which multicast packets will be directed. Conventional routing techniques can be applied in this regard. For instance, the PDSN may use Internet Group Management Protocol (IGMP) to inform a source multicast router that it wants to receive the flow associated with a particular multicast IP address. When the source multicast router receives the flow, the router will then transmit the flow to the PDSN and to any other nodes that have registered as routers for the flow.

Thus, when MCS 40 transmits multicast content to a particular multicast IP address, the content may be routed to the PDSN 30, and the PDSN 30 may send the multicast content along each active multicast link (if any) to the BSS, i.e., along the multicast link of each cell sector that is currently serving a wireless terminal in the multicast state. The BSS may then transmit the multicast content on the common multicast radio link into the cell sector associated with the multicast link. And each member wireless terminal in that cell sector may thus receive the multicast content transmitted on that common multicast radio link.

Figure 3:
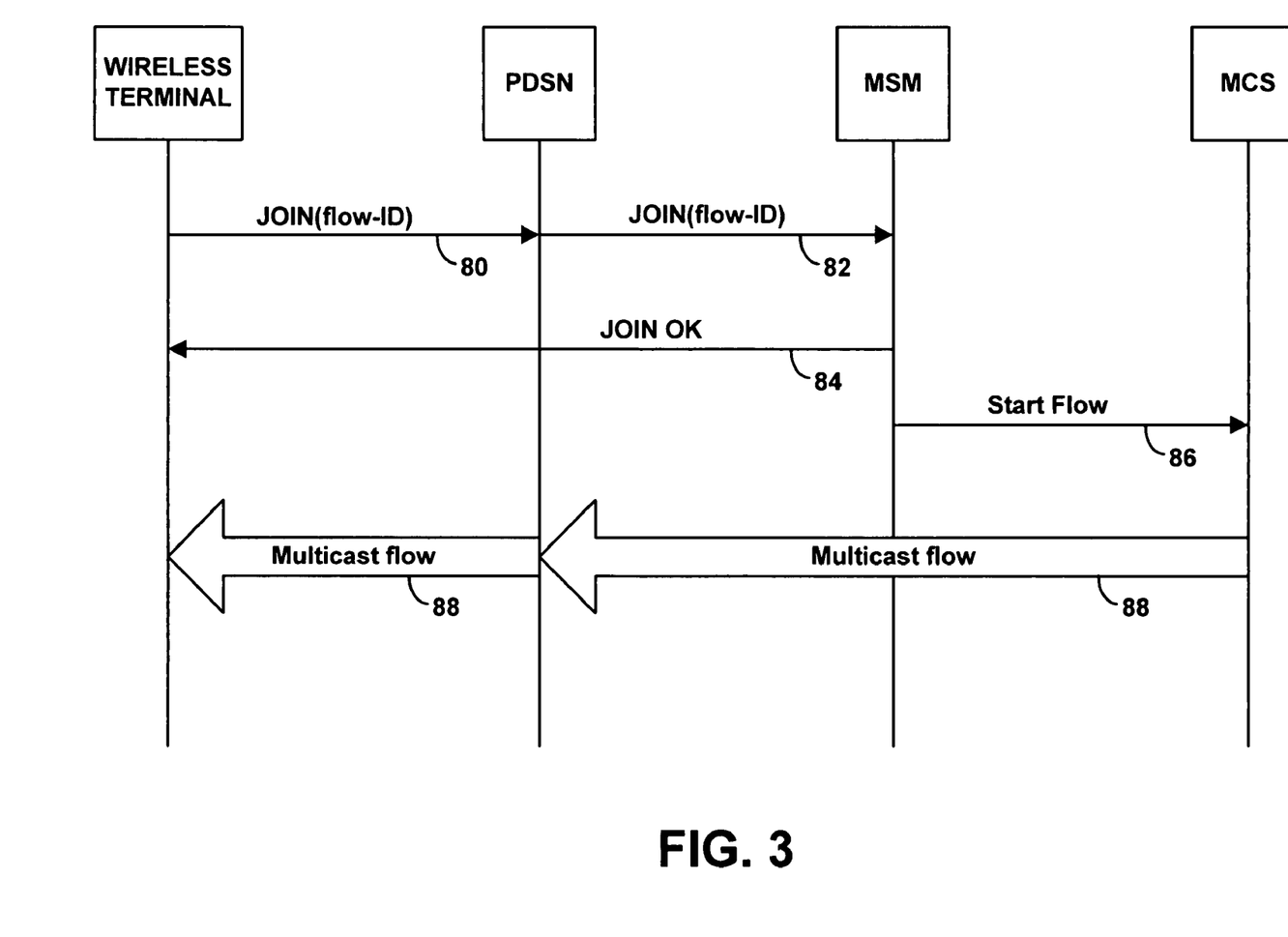
FIG. 3 is a message flow diagram depicting a process of joining a multicast group.

In order for a wireless terminal to begin receiving multicast content, in the exemplary embodiment, the terminal must join the associated multicast group. FIG. 3 is a message flow diagram depicting a process that can be carried out in order to join a wireless terminal into a multicast group As shown in FIG. 3, at steps 80 and 82, the wireless terminal may send a JOIN message (preferably IP-based) to MSM 42, seeking to join a particular multicast group and to thus begin receiving a particular multicast flow. More particularly, at step 80, the wireless terminal may send the JOIN message to the PDSN 30, via the BSS, and, at step 82, the PDSN 30 may forward the JOIN message to the MSM 42 (per a destination address specified with the message, for instance).

In the exemplary embodiment, the wireless terminal programmatically generates the JOIN message and includes in the JOIN message an indication of the particular multicast group that the terminal desires to join. Under current industry standards, a wireless terminal may receive a control signal designating available multicast groups or "channels," and the terminal may display a list of those channels for consideration by a user. The user may then select a desired channel, and the terminal may responsively send a JOIN message to the MSM 42, designating that user-selected channel.

At step 84, after authenticating and authorizing the terminal, the MSM 42 may then send a JOIN reply to the wireless terminal, granting the terminal's request to join the multicast group, i.e., to begin receiving the multicast flow. The MSM 40 may include in the JOIN reply a multicast IP address to which the wireless terminal should listen for the flow, and/or a filter, key or mask that the wireless terminal can use to read content sent to that multicast IP address, i.e., content sent to the multicast group.

If this is the first terminal that has joined the multicast group at issue, then, at step 86, the MSM 42 may send a START FLOW directive to the associated multicast content server, e.g., MCS 40. The START FLOW directive instructs the MCS 40 to begin transmitting the multicast flow to the group, i.e., to the multicast IP address. Thus, in response, at step 88, the MCS 40 begins transmitting the requested multicast flow, and the flow passes to the PDSN 30 and, from there, to each member terminal served by the PDSN 30. Each terminal may then present the received content to a user.

4. Establishing Multicast PoC Communication

In accordance with the exemplary embodiment, as described above, multicast PoC communication will be established by coupling a multicast-join process together with the PoC session setup process, and by having the PoC server function as a multicast content server, to multicast PoC communications to the PoC session participants.

Preferably, when a party initiates a PoC session, the PoC server 38 will responsively acquire a multicast flow-ID from the MSM 42, and the PoC server will convey that multicast flow-ID to each participant within the PoC session setup signaling. Upon receipt of that multicast flow-ID, each participant will then engage in signaling with the MSM 42, to join the associated multicast group. And the MSM 42 will direct the PoC server to begin multicasting the associated flow to the group members, which the PoC server will do once it begins receiving PoC bearer data from one of the PoC session participants.

Figure 4:
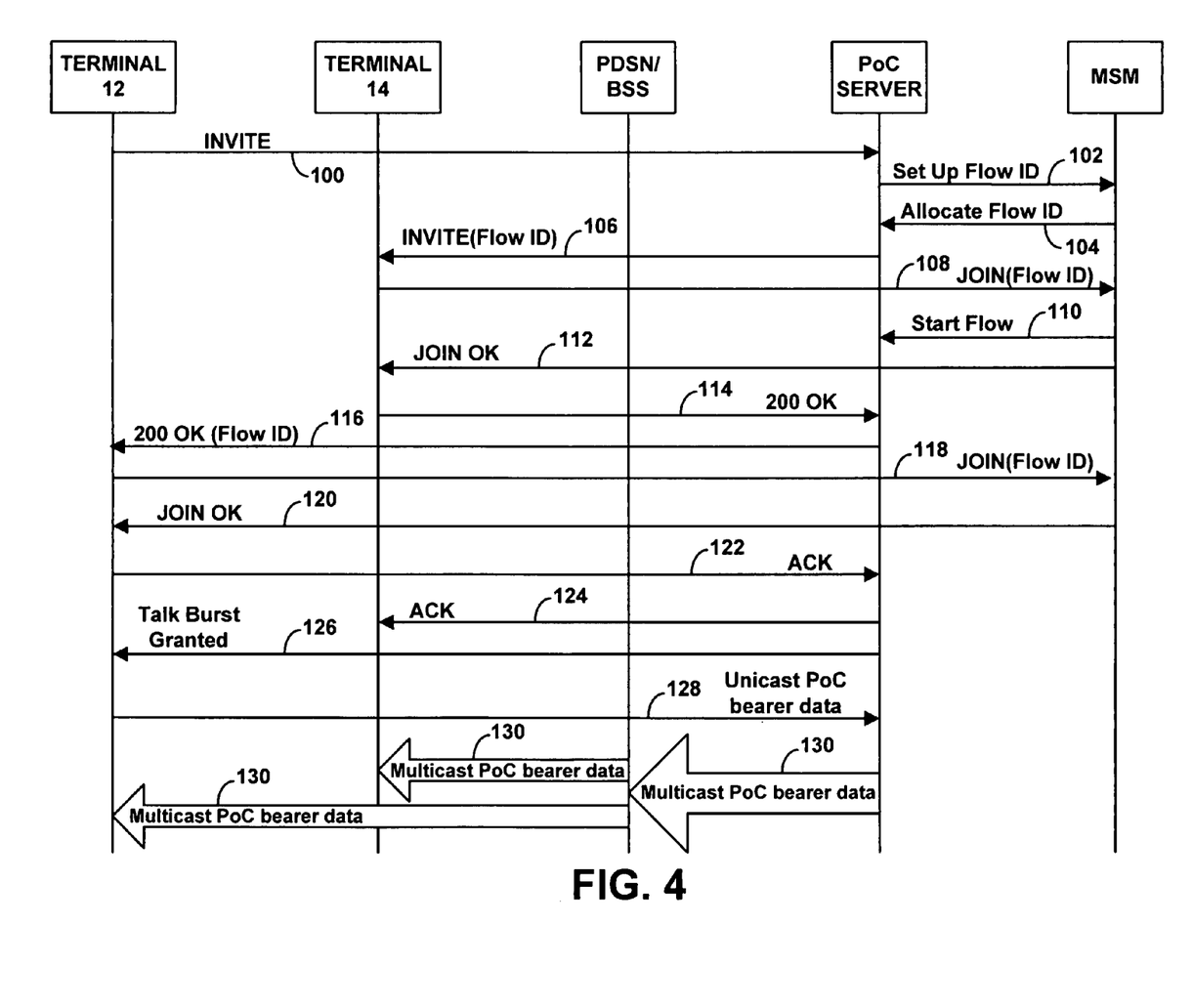
FIG. 4 is a message flow diagram depicting establishment of multicast PoC communication.

FIG. 4 is a message flow diagram depicting an example of this process in more detail. For simplicity, the message flow illustrates a process of setting up a two-party PoC session, namely a session between wireless terminals 12 and 14. It should be understood, however, that the process can extend as well to initiation of a PoC session between any number of terminals, such as between terminals 12, 14 and 16, for instance. Further, note that the various signaling messages shown in the message flow may pass through one or more other entities not shown, and those one or more entities may act on the messages in various ways and perhaps even generate additional messages. For instance, the messages may pass through an IP Multimedia Subsystem (IMS) Call Session Control Function (CSCF) (not shown).

As shown in FIG. 4, at step 100, terminal 12 starts the process upon user request (e.g., invocation of a PoC button), by sending an INVITE to PoC server 38. Conventionally, the INVITE may designate in a header (e.g., an SDP header) one or more targets with which terminal 12 is seeking to establish the PoC session. In this simplified example, the assumption is that the INVITE designates terminal 14 as the only target.

Upon receipt of the INVITE, at step 102, the PoC server programmatically sends a flow-ID request to MSM 42, seeking a multicast flow-ID to be used for this PoC session. In response, the MSM then assigns a multicast flow-ID and, at step 104, the MSM 42 returns a flow-ID allocation message to the PoC server, designating the assigned multicast flow-ID. In this example, the multicast flow-ID is assumed to be a multicast IP address. Thus, after the PoC server receives the multicast flow-ID, the PoC server will be able to transmit PoC bearer data to that multicast IP address, once directed to start doing so.

At step 106, the PoC server then sends an INVITE to terminal 14, in an effort to establish a PoC session leg with terminal 14. According to the exemplary embodiment, the PoC server will conveniently include in this INVITE to terminal 14 the multicast flow-ID, so that terminal 14 can then join the multicast group. Thus, upon receipt of the INVITE, PoC session setup signaling with terminal 14 will pause momentarily, while terminal 14 joins the multicast group. (Alternatively, the process of joining terminal 14 into the multicast group may occur after the PoC session setup signaling with terminal 14 is complete, or at some other time in relation to the PoC setup process.)

To join the multicast group, at step 108, terminal 14 sends a JOIN request via PDSN 30 to MSM 42, including in the JOIN request the multicast flow-ID that the PoC server provided in the INVITE. At step 110, MSM 42 then responsively directs the PoC server to begin transmission of the multicast flow to the multicast group. If the multicast flow-ID is the multicast IP address, as indicated above, the PoC server can transmit the flow to that multicast IP address. Alternatively, at this point, the MSM could provide the PoC server with a multicast IP address to which the PoC server should transmit the PoC bearer data. Further, at step 112, the MSM also sends an affirmative JOIN reply to terminal 14, providing terminal 14 with the multicast IP address (if the flow-ID was not already that address) and any other data that terminal 14 needs in order to be able to receive the multicast transmission from the PoC server.

Once the multicast join process for terminal 14 is complete, terminal 14 then accepts the PoC server's INVITE by sending a 200 OK to the PoC server, at step 114.

At step 116, after receipt of the 200 OK from terminal 14, the PoC server responds to the INVITE from terminal 12, by sending a 200 OK to terminal 12. According to the exemplary embodiment, the PoC server will conveniently include in this 200 OK to terminal 12 the multicast flow-ID, so that terminal 12, like terminal 14, can then join the multicast group. Thus, upon receipt of the 200 OK, PoC session setup signaling with terminal 12 will pause momentarily, while terminal 12 joins the multicast group. (Alternatively, the process of joining terminal 12 into the multicast group can occur after the PoC session setup signaling with terminal 12 is complete, or at some other time in relation to the PoC setup process.)

To join the multicast group, at step 118, terminal 12 sends a JOIN request via PDSN 30 to MSM 42, including in the JOIN request the multicast flow-ID that the PoC server provided in the 200 OK. At step 120, the MSM then sends an affirmative JOIN reply to terminal 12, providing terminal 12 with the multicast IP address (if the flow-ID was not already that address) and any other data that terminal 12 needs in order to be able to receive the multicast transmission from the PoC server. (At this point, the MSM has already instructed the PoC server to begin transmitting the multicast flow, so the MSM need not repeat that directive to the PoC server.)

At step 122, once the multicast join process for terminal 12 is complete, terminal 12 then sends an ACK to the PoC server, to complete setup of the PoC session with respect to terminal 12. The effect of this PoC session setup signaling with terminal 12 may be the establishment of an RTP leg between terminal 12 and the PoC server. Terminal 12 may use that RTP leg to transmit PoC bearer data to the PoC server when terminal 12 is the talker in the PoC session. When terminal 12 is not the talker, the BSS may release the air interface traffic channel that had been assigned to terminal 12 for that reverse link communication, thus freeing up the channel for use by others. Further, the PoC session setup signaling with terminal 12 allows the PoC server to record the fact that terminal 14 is engaged in the PoC session, thereby enabling the PoC server to manage session participation.

Further, at step 124, once the PoC server receives the ACK from terminal 12, the PoC server then sends an ACK to terminal 14, to complete setup of the PoC session with respect to terminal 14. The effect of this PoC session setup signaling with terminal 14 may similarly be the establishment of an RTP leg between terminal 14 and the PoC server. Terminal 14 may use that RTP leg to transmit PoC bearer data to the PoC server when terminal 14 is the talker in the PoC session. When terminal 12 is not the talker, the BSS may release the air interface traffic channel that had been assigned to terminal 14 for that reverse link communication, thus freeing up the channel for use by others. Further, the PoC session setup signaling with terminal 14 similarly allows the PoC server to record the fact that terminal 12 is engaged in the PoC session, thereby also enabling the PoC server to manage session participation.

In operation during the PoC session, terminal 12 may initially have the floor, as indicated in FIG. 4 at step 126. At step 128, terminal 12 may thus unicast PoC bearer data to the PoC server. And upon receipt of that PoC bearer data, at step 130, the PoC server may multicast the PoC bearer data to the members of the associated multicast group, namely, to terminals 12 and 14. (To avoid echo issues, the terminal that is the talker at any given time may programmatically disregard the incoming multicast flow for the PoC session).

It should be understood that the various functions described above can be carried out by one or more entities. For example, the process of "conveying" a message from one entity to another could be carried out by the sending entity, an entity in the middle of the communication path, or some other entity. As another example, the process of "conducting" a message exchange could be carried out by one or more of the endpoints in the message exchange and/or by a party in the middle of the communication path, e.g., a party facilitating the message exchange.

5. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A method of establishing multicast Push-to-x over Cellular (PoC) communication, comprising:

conveying a first initiation request from an initiating party to a PoC server, the first initiation request seeking establishment of a PoC session between the initiating party and at least one target party;

conveying from the PoC server to a target party a second initiation request provided by the PoC server after receipt of the first initiation request, the second initiation request containing a multicast flow-ID provided by a multicast session manager (MSM), the multicast flow-ID corresponding with a multicast flow for multicasting PoC communications of the PoC session from the PoC server to one or more participants in the PoC session;

conveying from the target party to the MSM a first join request defining a request by the target party to receive the multicast flow, the first join request being provided by target party after the target party receives the second initiation request;

conveying from the MSM to the target party a first join reply granting the first join request, and conveying from the MSM to the PoC server a directive for the PoC server to multicast, in the multicast flow, PoC communications to one or more participants in the PoC session;

conveying from the target party to the PoC server an acceptance of the second initiation request, the acceptance of the second initiation request being provided by the target party after the target party receives the first join reply;

conveying from the PoC server to the initiating party an acceptance of the first initiation request, the acceptance of the first initiation request being provided by the PoC server after the PoC server receives the acceptance of the second initiation request, the acceptance of the first initiation request containing the multicast flow-ID;

conveying from the initiating party to the MSM a second join request defining a request by the initiating party to receive the multicast flow, the second join request being provided by initiating party after the initiating party receives the acceptance of the first initiation request;

conveying from the MSM to the initiating party a second join reply granting the second join request; and conveying the multicast flow from the PoC server to at least each listener in a group comprising the target party, wherein the multicast flow carries the PoC communications of the PoC session.

2. The method of claim 1, wherein the first initiation request comprises a Session Initiation Protocol (SIP) INVITE message, and the acceptance of the first initiation request comprises a SIP 200 OK message, the method further comprising conveying a SIP ACK message from the PoC server to the target party after conveying the acceptance of the second initiation request.

3. The method of claim 1, wherein conveying the multicast flow from the PoC server to at least each listener in the group comprises:

transmitting the PoC communications from the PoC server to a multicast IP address defined by the multicast flow-ID, whereby the PoC communications are thus routed to at least one packet data serving node (PDSN) and over at least one multicast radio link to one or more listeners in then group.

4. The method of claim 1, wherein the second initiation request comprises a Session Initiation Protocol (SIP) INVITE message.

5. The method of claim 1, wherein the acceptance of the second initiation request comprises a SIP 200 OK message.

6. The method of claim 1, wherein the initiating party comprises a cellular wireless client device.

7. The method of claim 1, wherein the target party comprises a cellular wireless client device.

* * * * *

UNITED STATES PATENT AND TRADEMARK OFFICE
CERTIFICATE OF CORRECTION

PATENT NO. : 7,573,837 B1  Page 1 of 1
APPLICATION NO. : 11/407121
DATED : August 11, 2009
INVENTOR(S) : Mangal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Seventh Day of September, 2010

David J. Kappos
*Director of the United States Patent and Trademark Office*